May 21, 1940.   E. W. N. BOOSEY   2,201,711
DRAINAGE FITTING
Filed June 21, 1938
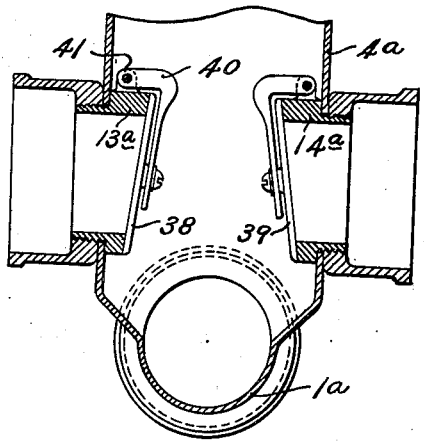
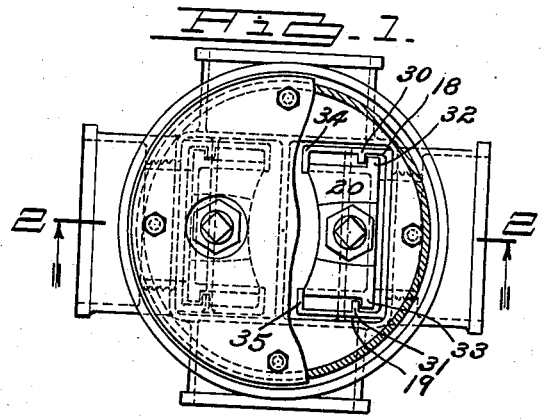
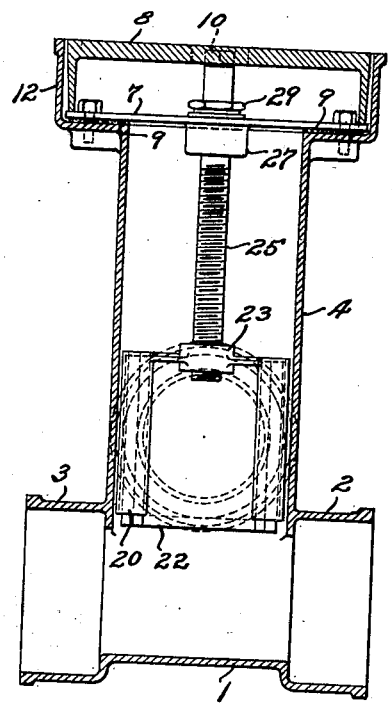
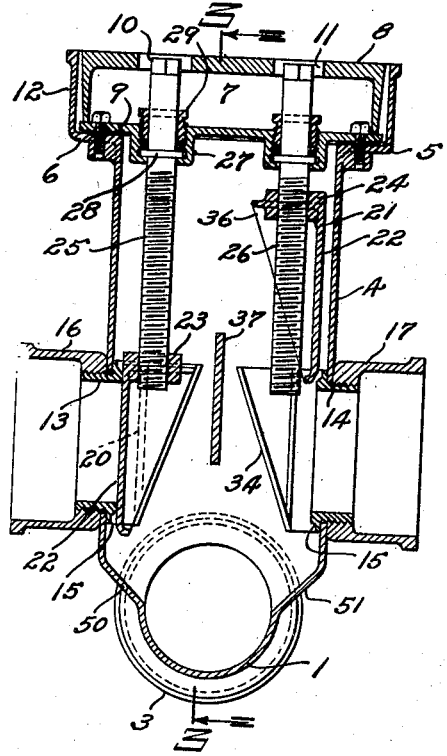
INVENTOR.
Edward W. N. Boosey
BY
ATTORNEY.

Patented May 21, 1940

2,201,711

UNITED STATES PATENT OFFICE 2,201,711

DRAINAGE FITTING

Edward W. N. Boosey, Detroit, Mich.

Application June 21, 1938, Serial No. 214,963

4 Claims. (Cl. 277—60)

This invention relates to drainage fittings, the object being to provide a fitting for installation in the main sewer of a building and to which fitting a conduit for the basement fixtures and conduit for the ground water system discharge and valves arranged to prevent back flow from the building sewer to either of the conduits discharging thereto. Ordinarily, the fixtures above the basement floor and the rain water conductors discharge directly to the main sewer and as these fixtures and the rain water conduits extend to a height above the ground level, back pressure will not ordinarily affect the same.

In previous construction, sewage and waste conduits all discharge to the same building sewer which in turn discharges to the street sewer and a valve closable by back pressure is installed in the building sewer to prevent back flow therein from the street sewer. Such arrangement is undesirable as flow from the fixtures above the basement and from the rain water conductors is prevented from passing to the street sewer. This invention seeks to provide a single fitting to which the basement sewage lines and the ground water lines both discharge and adapted for installation in the main sewer of the building to prevent back flow in the ground water and basement sewage conduits and while maintaining the main sewer of the building open for a flow from a rain water conduit and sewage and waste water from fixtures usually above the ground level.

These and other objects and novel features of the invention are hereinafter more fully described and claimed, and the preferred form of construction of a drainage fitting embodying my invention is shown in the accompanying drawing in which—

Fig. 1 is a plan view partially in section showing my improved fitting.

Fig. 2 is a vertical section taken on line 2—2 of Fig. 1.

Fig. 3 is a vertical section taken on line 3—3 of Fig. 2.

Fig. 4 is a partial vertical section showing the automatic swing check valves.

In the usual house or building drainage system, conduits for the sewage disposal are provided as well as conduits for ground water passing to conduits below the basement floor and in accordance with my invention, both the sewage and the ground water disposal conduits discharge to a single fitting.

In the construction shown in Fig. 1, the fitting consists in a unitary structure having a horizontal conduit portion 1 provided with hubs 2 and 3 at its opposite ends for connection in the main sewage conduit. Preferably, integrally with the conduit portion 1 is formed a vertical casing 4 which is open directly to the conduit portion 1 in the main sewage line and has an upper flanged head 5 formed with a shoulder 6 to receive a closure plate 7 and a removable cap 8.

There is usually also a packing 9 between the plate 7 and the shoulder 6 of the vertical member 4 which prevents odors and liquids from rising in the chamber formed by the cap member 7 and thence to atmosphere through the openings 10 and 11 or through the interstice between the cover member 8 and the vertical flange 12 of the end 5. The upper end 5 of the casing may be positioned practically flush with the floor of a building, usually the basement floor (not here shown). The vertical casing 4 has apertures on its opposite sides to receive a collar 13 and 14 respectively each of which is formed with a flange 15 of greater diameter than the aperture and with a threaded end projecting to the exterior of the casing to receive a threaded hub 16 for the collar 13 and 17 for the collar 14. To one of the hubs, as for instance 16, is connected the sewage disposal conduit of a building and to the hub 17 is connected the rain and water conduit. By the described arrangement of the hubs and collars for supporting the same thereon, the collars are readily assembled in place by introducing the collar into the interior of the casing 4 and inserting the threaded end through the aperture therefor provided in the casing and thereafter rotating the hub to thread the same thereonto to secure it in position. This is a desirable arrangement as otherwise the members 13 or 14 would require to be rotated to thread into the hubs 16 or 17 if they were integral with the casing and the guideways for the valve under such condition might not lie in a vertical plane in the proper position to receive the valve. However, by placing the collar through the opening and rotating the hub to secure the same in position, the collar may be held with the way for the valve in proper relation to receive the same which in this form of the invention is movable in a vertical plane.

As seen in Figs. 1 and 2, each of the collars 13 and 14 has inwardly extending flanges 18 and 19 and these flanges support a valve 20 for the fitting 13 and 21 for the fitting 14. These valves each have a flat face shown at 22 in each instance which are intended to tightly fit the finished end of the collar 13 or 14. It is desired that the valves be a tight fit and also be held from rotation. Each valve plate has an apertured and threaded end 23 and 24 respectively to receive an adjusting screw 25 or 26.

These adjusting screws extending upwardly through the sealing plate 7 which is recessed as at 27 and each of the screws is provided with an enlarged ring-like portion 28 to seat in the bottom of the recess. The recess is internally threaded to receive the packing nut 29. Rotation of the adjusting screws 25 or 26 in one direction or the other moves the respective valve to open or close the respective inlets. The valve members ride between the flanges 18 and 19 of the respective collar members 13 and 14 and these flanges are respectively provided with vertical ribs 30 and 31 upon opposite sides thereof. The vertical side faces of each valve member are formed with vertical ribs 32 and 33 which ride between the vertical ribs 30 and 31 and the adjacent face of the fitting. The ribs 32 and 33 are a loose fit and hold the valve from rotation through operation of the adjusting screw 25 or 26.

It is essential that the valve, when in closed position, shall tightly fit the finished face of the collar 13 or 14. For this purpose, the inner edge of the flanges 18 or 19 have inturned terminal portions 34 and 35 and these, as will be seen from Fig. 2, are inclined to the vertical and extend downwardly and outwardly in respect to a vertical center line of the member 4.

The forward edge 36 of each of the valves is similarly inclined so that as the valve 21, for instance, is moved downwardly to closed position— that is, to the position occupied by the valve member 20 at the left side of Fig. 2, the inclined edge 36 of the valve plate engages the inclined flanges 34 and 35 and wedges the valve face 22 to tight engagement with the finished face of the collar 14 and thus by manual operation either or both conduits connected with the hub portions 16 and 17 may be closed or opened to the interior of the fitting.

It is commonly the practice to have both valves open but if for some reason, as for instance, water flushing into the sewer is sufficiently great to cause a raise in level of the liquid in the casing 4, pressure would cause the sewage to pass into both the ground water line connected with the hub 17 and the sewage line connected with the hub 16 and in such event both the valve members 20 and 21 are to be moved to closed position to prevent back flow into the conduits of the building.

Inasmuch as these fittings are intended to be placed in a basement floor beneath which the drainage lines are positioned, the said drainage lines for connecting with the fitting are usually at the same level and thus the hubs 16 and 17 occupy the same horizontal position and open opposite each other in the casing.

If both valves be open, which is the usual condition, sewage might discharge across into the ground water conduit or ground water discharge across into the sewage disposal conduit. To prevent such crossing of the liquid through the valved openings, I provide a partition 37 extending horizontally across the fitting between the valved openings and preferably the lower edge is a little higher than the lower side of the collars 13 and 14. This partition tends to deflect the liquid from either of the conduits discharging to the fitting through the respective collar members 13 and 14 and cause the same to pass downwardly to the sewer section 1. It is desirable that the distance from the lower edge of the partition member 7 to either collar is such as to permit free flow to the main sewer 1 from either of the conduits discharging to the fitting.

The casing 4 is of greater width transversely of the conduit section 1 than the diameter of the conduit and the opposite side walls extend to the conduit by downwardly and inwardly inclined wall portions 50 and 51 in either of the structures as is shown in Figs. 2 and 4. With this arrangement, the collars project inwardly of the side wall of the casing 4 and the valves, on opening, permit the material to flow through the collars and into the casing and to the conduit section 1 without possibility of any non-liquid material lying on the lower edge of the collar portions which would tend to prevent closing of the valves. This arrangement also prevents an accumulation of material on the inclined walls 50 and 51 to a point to interfere with the operation of the valves.

The arrangement of the parts above described provides a manually controllable fitting where either or both the conduits discharging thereto may be closed to prevent back flow thereinto from the main sewer. The conduit may be closed to the fitting in order to prevent back pressure therein while the other may be open which is the position of the parts shown in Fig. 2.

Where it is preferable that this fitting shall operate automatically to prevent back flow either into the rain water or the sewage water lines discharging to the fitting, the construction shown in Fig. 4 is utilized. This structure includes the main conduit section 1a having the vertical casing 4a which is apertured to receive the collar members 13a and 14a and to which the sewage and rain water lines are respectively connected as in the case shown in Figs. 1 and 2. These collars, however, are differently formed on their inner ends than is the structure shown in Figs. 1 and 2. In place of the manually controlled valves and the inclined flanges for causing a tight fit of the valve to the collars, I provide a swing check valve 38 and 39 for the respective collars. The inner faces of the collar members are formed with inclined faces. The valves are each supported in place as by an arm 40 pivoted at 41 to the rear of the lower edge of the valve so that the valve tends to close by gravity.

In this construction the flow into the fitting through the collar member 14a or the collar member 13a will open the respective valve and the valve itself, if both valves are swung open, prevent passage of fluid from either the rain water line or the sewage water discharge line to the other discharging to the casing and thus serve the same purpose as the partition 37 of Fig. 2. In the arrangement shown in Fig. 4, the same facility of assembly of the collar members 13a and 14a with the respective hubs having a threaded aperture to receive the same is secured as in the form of the invention shown in Fig. 2, it being necessary that the swing valves shall be positioned to turn about a horizontal axis.

This valve arrangement of either form described is desirable in a fitting of this character as both the conduits discharging to the fitting are most conveniently placed at the same level below the floor line. In the construction shown in Fig. 4, less cost is involved and the casing 4a will have end portions and a cap member like the cap 8 of Fig. 2. This cap need not be apertured but merely provides for access to the interior of the fitting and to the valves. The structure shown in Fig. 4 in all its essential respects is similar to that shown in Fig. 2 except the valve arrangement and serves the same purpose.

It is pointed out that this fitting includes a section of a main sewer and for connection in such a sewer which is below the level of the drainage lines discharging to the fitting are above the normal line of flow in the sewer section even when it is flowing full. Under normal conditions, the valves of the structure shown in Fig. 2 stand in the open position and need be closed only during an abnormal condition as high pressure in the main sewer line tending to fill the vertical portion 4 and thus causes back pressure in the conduits discharging to the fitting.

From the foregoing description, it is believed evident that the various objects and features of the invention are attained by the structures described, and it is pointed out that various changes may be made from the construction herein shown without departing from the spirit and scope of the appended claims.

Having thus fully described my invention, its utility and mode of operation, what I claim and desire to secure by Letters Patent of the United States is—

1. In a drainage fitting having a body adapted at its lower end for connection with a sewer, said body having an inlet aperture, a collar member having a threaded end for insertion through the aperture and an opposite end of greater external diameter providing a shoulder to engage the wall of the body about the aperture, the inner end of the said body having a finished face for cooperation with a valve member, and a hub adapted to receive an inlet conduit and having a threaded aperture at its end less in diameter than the diameter of the body and providing a shoulder to engage the exterior face of the wall of the casing about the aperture to thereby clamp the wall between the collar and the hub with the said finished face of the collar in position for proper functional relationship with the valve.

2. A drainage fitting for assembly in a sewer, comprising a hollow casing having means at its lower end for connection in a sewer, said casing having inlet openings in the respective opposite sides, the lowermost point of each of which being above the uppermost point of the sewer opening to the casing, the said inlet openings being axially aligned, collar members each having a threaded end portion insertable from the interior of the casing through the respective opening and a portion of larger external diameter than the threaded portion and engaging the inner face of the casing about the opening, a hub member for each inlet each having a threaded opening for threading the same onto the threaded portion of the respective collar member and engaging the exterior face of the casing, and a valve member for engaging the end of each collar member within the casing, said hub members each being adapted to receive a conduit.

3. In a drainage fitting having a body adapted at its lower end for connection with a sewer, said body having apertures in opposite side walls of the casing above the sewer connection, a collar member for each aperture each having a hub end portion and a smaller diameter threaded portion for introduction through the respective aperture from the interior of the casing providing a shoulder between the threaded and hub ends of the collar for engaging the inner face of the casing, and a hub for each collar each adapted to receive a conduit and having a threaded aperture less in diameter than the hub for threaded engagement with the projecting end of the respective collar and providing for the connection of a conduit to the external hub subsequent to assembly with the collar, each of the said collar members having a finished face in the interior of the casing, and a valve means for each collar member engageable with the finished face thereof to thereby close the inlet conduit connected therewith.

4. In a drainage fitting having a body adapted at its lower end for connection with a sewer, said body having apertures in opposite side walls of the casing above the sewer connection, a collar member for each aperture each having a hub end portion and a smaller diameter threaded portion for introduction through the respective aperture from the interior of the casing providing a shoulder between the threaded and hub ends of the collar for engaging the inner face of the casing, and a hub for each collar each adapted to receive a conduit and having a threaded aperture less in diameter than the hub for threaded engagement with the projecting end of the respective collar and providing for the connection of a conduit to the external hub subsequent to assembly with the collar, each of the said collar members having a finished face in the interior of the casing, and a swing check valve mounted on the inner end of each collar member and adapted to close the same on back flow from the sewer into the casing.

EDWARD W. N. BOOSEY.